April 24, 1962   W. F. SWANTON   3,031,174
FLUID PURIFIER AND SEALING VALVE
Filed March 10, 1959
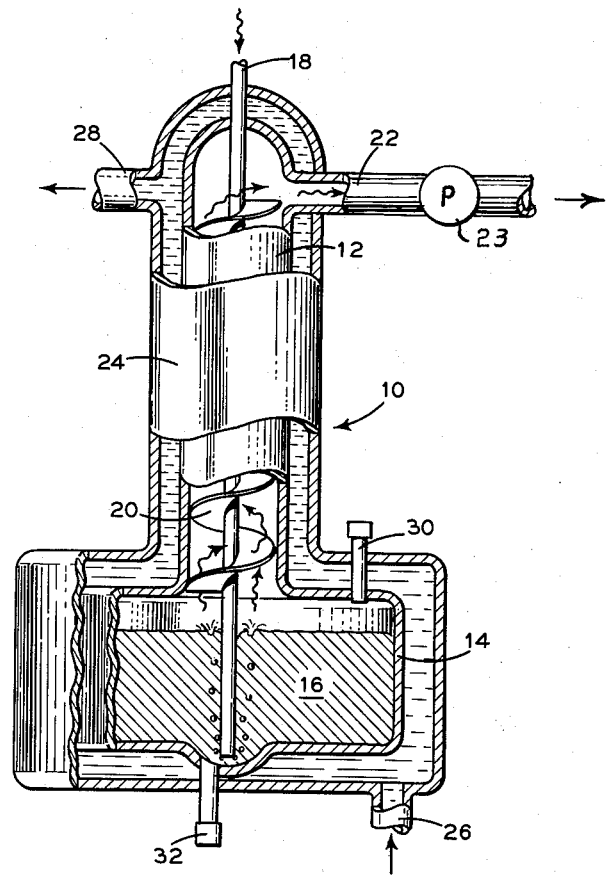
INVENTOR.
Walter F. Swanton
BY
ATTORNEY

United States Patent Office 3,031,174
Patented Apr. 24, 1962

3,031,174
FLUID PURIFIER AND SEALING VALVE
Walter F. Swanton, Avon, N.Y., assignor, by mesne assignments, to the United States of America as represented by the United States Atomic Energy Commission
Filed Mar. 10, 1959, Ser. No. 798,517
4 Claims. (Cl. 261—138)

This invention relates in general to a fluid purifier and more specifically, it relates to a new and improved combination of a cold-trap and a seal.

In a process system where a fluid is used and tends to pick up vapors or other contaminants from the fluids with which it has been in contact, it is often desirable to remove these vapors and other foreign particles from the fluid before subsequent recycling or disposal. This is commonly done in an apparatus known as a cold-trap, a cold-trap being a device which is maintained at a temperature lower than that of the fluid passing therethrough, thereby condensing the vapors and coalescing or solidifying the foreign particles to assist in removing them from the fluid.

In such a system, it is often necessary to carry on the process at a pressure less than atmospheric or less than that in other portions of the accompanying processes. This makes it necessary to include a sealing valve of some type in the "off-gas" line, as this vapor bearing fluid line is called, to prevent a pressure change and a subsequent reversal of fluid flow in case of a pump failure in this "off-gas" line.

Accordingly, it is the purpose of the present invention to form a cold-trap for the condensation of collected vapors and foreign particles in a fluid in combination with a sealing valve all within a single compact unit.

Further, the present invention provides a container for a sealing liquid through which the fluid to be purified passes. This sealing liquid acts both as a sealing valve between the inlet and outlet of the fluid purifier and as a trap for entrained particles and vapors.

Also, the present invention provides a means, in conjunction with the sealing and purifying liquid, to prevent flow reversal of the fluid being purified in case of pump failure.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described a preferred embodiment of the invention.

The accompanying figure shows the fluid purifier, generally indicated by 10, which is composed of an inner vessel having an upper portion 12 of a relatively small circular cross section which opens into and forms an extension of a larger lower portion 14. The lower portion 14 of this vessel is adapted to contain a body of sealing liquid 16. A contaminated-fluid inlet conduit 18 extends down through the upper portion 12 of the vessel and empties into the lower portion of the sealing liquid 16 in the lower portion 14 of the vessel. A purified-fluid outlet 22 with a pump 23 is provided in the upper extremity of the upper portion 12 of the vessel near the inlet conduit 18. A spiral baffle 20 is provided around the portion of the inlet conduit 18 within the upper portion 12 of the vessel.

In operation, the contaminated fluid enters the vessel via the inlet conduit 18 and empties into the lowest portion of the sealing liquid 16. As the contaminated fluid bubbles up through the sealing liquid 16, it is cooled to condense out entrained vapors and solids. The purified, cooled fluid continues up around conduit 18, directed by the spiral baffle 20, thereby providing initial cooling to the incoming contaminated fluid. The extended flow path provided by the spiral baffle 20 affords a longer residence time for the cooler fluid, this initiating the condensation process upon the incoming fluid. The purifier fluid then leaves the vessel via the outlet conduit 22, when pump 23 causes flow of the contaminated fluid through purifier 10.

The sealing and purifying liquid in the present invention is one and the same and may be any one of a number of liquids. Mercury, water, liquid sodium, or liquid bismuth, among others, may be used depending upon the combination of the fluid being purified, the gases and foreign particles to be trapped out, the temperatures involved, and the pressure differential occurring across the purifier and sealing valve.

Inlet line 26 and outlet line 28 serve a water jacket 24 which surrounds and is adapted to cool the inner vessel portions 12 and 14 to maintain the condensing effectiveness of the sealing liquid 16 and the purified effluent.

While the purifying action of the present invention has been described above, the seal acts as follows: A means for producing a pressure differential across the fluid purifier, such as pump 23, is used to pump the fluid being purified from an area of low pressure to one of higher pressure. This fluid enters the purifier and seal via inlet conduit 18, bubbles up through the sealing liquid 16, and leaves via the outlet conduit 22. Should pump 23 fail, the higher pressure in the outlet conduit would tend to reverse the flow through the purifier and seal acting on the surface of the sealing liquid 16 to force this liquid up into the inlet conduit 18 for a height dictated by the pressure differential and the density of the sealing liquid used. As an example: if the inlet side of the purifier were operating at a pressure of 5 p.s.i.a., and the outlet discharged through pump 23 to the atmosphere, 14.7 p.s.i.a., and the pump failed, a pressure differential of 9.7 p.s.i. would then exist across the purifier and seal. With mercury used as the purifying and sealing liquid in this case, the mercury would rise 18.75 inches into the inlet conduit. If the inlet conduit 18 is so constructed as to be of greater vertical height than that dictated by the pressure differential and the density of the sealing liquid used, the sealing liquid would then form a seal between the outlet and inlet conduits, effectively maintaining the pressure on the inlet conduit side at its original value. For any particular installation, a vertical height particular to the pressure differential encountered and the density of the sealing liquid employed would be used in the practice of this invention.

Inasmuch as the purifying and sealing liquid 16 would be contaminated by the foreign matter trapped in it, fill and drain connections 30 and 32, respectively, are provided in the lower portion 14 of the vessel to permit its replacement.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for trapping entrained vapors and solids in a contaminated process gas and discharging the latter at a pressure higher than the process gas pressure, comprising a vessel adapted to contain a body of sealing liquid in the lower portion thereof, a contaminated-gas inlet conduit passing down through said vessel and body of sealing liquid and having an exit adjacent the inner bottom of said vessel, a purified-gas outlet from said vessel above said body of sealing liquid extending in heat exchange relationship with said inlet conduit for precooling the incoming gas, pump means in said gas outlet for raising the pressure of said gas for discharging the latter whereby said apparatus operates at a pressure below the discharge pressure, and heat exchange means in indirect heat transfer relationship with the interior of said vessel for cooling said body of sealing liquid to a temperature which will condense out said vapors, said inlet conduit having a vertical height at least as great as the maximum head of said sealing liquid at the maximum pressure differential to which said apparatus is subjected for maintaining a fluid type seal through said apparatus against reversal of gas flow in the event of failure of said pump means.

2. Apparatus for trapping entrained vapors and solids in a contaminated process gas and discharging the latter at a pressure higher than the process gas pressure, comprising a cylindrical vessel having a vertically elongated circular cross section, said cylindrical vessel having an upper portion of relatively small diameter opening into the lower portion with a relatively large diameter, said lower portion of said vessel adapted to contain a body of sealing liquid, a vertical contaminated-gas inlet conduit passing downthrough said vessel and body of sealing liquid within said vessel and having an exit adjacent the inner bottom of said vessel, a purified-gas outlet from said vessel adjacent said inlet conduit at the top of said cylindrical vessel in said portion of relatively small diameter for precooling the incoming gas, pump means in said gas outlet for raising the pressure of said gas for discharging the latter whereby said apparatus operates at a pressure below the discharge pressure, and heat exchange means in indirect heat transfer relationship with the interior of said vessel for cooling said body of sealing liquid to a temperature which will condense out said vapors, said inlet conduit having a vertical height at least as great as the maximum head of said sealing liquid at the maximum pressure differential to which said apparatus is subjected for maintaining a fluid type seal through said apparatus against reversal of gas flow in the event of a failure of said pump means.

3. Apparatus for trapping entrained vapors and solids in a contaminated process gas and discharging the latter at a pressure higher than the process gas pressure, comprising a cylindrical vessel having a vertically elongated circular cross section, said cylindrical vessel having an upper portion of relatively small diameter opening into the lower portion with a relatively large diameter, said lower portion of said vessel adapted to contain a body of sealing liquid, a vertical contaminated-gas inlet conduit passing downthrough said vessel and body of sealing liquid within said vessel and having an exit adjacent the inner bottom of said vessel, a purified-gas outlet from said vessel adjacent said gas inlet conduit at the top of said cylindrical vessel in said portion of relatively small diameter, pump means in said gas outlet for raising the pressure of said gas for discharging the latter whereby said apparatus operates at a pressure below the discharging pressure, said inlet conduit having a vertical height at least as great as the maximum head of said sealing liquid at the maximum pressure differential to which said apparatus is subjected for maintaining a fluid type seal through said apparatus against reversal of gas flow in the event of failure of said pump means, said cylindrical vessel having a height at least as great as said inlet conduit, a baffle exterior to said inlet conduit and within said upper portion of said vessel extending from the top of said cylindrical vessel to the top of said lower portion of said cylindrical vessel for precooling said incoming gas, and heat exchange means in indirect heat transfer relationship with the interior of said vessel for cooling said body of sealing liquid to a temperature which will condense out said vapors as the contaminated gas bubbles therethrough.

4. Apparatus for trapping entrained vapors and solids in a contaminated process gas and discharging the latter at a pressure higher than the process gas pressure, comprising a cylindrical vessel having a vertically elongated circular cross section, said cylindrical vessel having an upper portion of relatively small diameter opening into the lower portion with a relative large diameter, said lower portion of said vessel adapted to contain a body of sealing liquid, a vertical contaminated-gas inlet conduit passing downthrough said vessel and body of sealing liquid within said vessel and having an exit adjacent the inner bottom of said vessel, a purified-gas outlet from said vessel adjacent said inlet conduit at the top of said cylindrical vessel in said portion of relatively small diameter, pump means in said gas outlet for raising the pressure of said gas for discharging the latter whereby said apparatus operates at a pressure below the discharging pressure, said inlet conduit having a vertical height at least as great as the maximum head of said sealing liquid at the maximum pressure differential to which said apparatus is subjected for maintaining a fluid type seal through said apparatus against reversal of gas flow in the event of failure of said pump means, said cylindrical vessel having a height at least as great as said inlet conduit, a spiral baffle exterior to said inlet conduit and within said upper portion of said vessel extending from the top of said cylindrical vessel to the top of said lower portion of said cylindrical vessel for precooling said incoming gas, heat exchange means in indirect heat transfer relationship with the interior of said vessel for cooling said body of sealing liquid for maintaining said sealing liquid at a temperature which will condense out said vapors as the contaminated gas bubbles therethrough, and means for filling and emptying said vessel with said sealing liquid.

References Cited in the file of this patent

UNITED STATES PATENTS

| | | |
|---|---|---|
| 1,138,460 | Derby | May 4, 1915 |
| 1,156,022 | Riis | Oct. 5, 1915 |
| 1,827,386 | De Markus | Oct. 13, 1931 |
| 2,239,181 | Smith | Apr. 22, 1941 |
| 2,356,530 | Pflock | Aug. 22, 1944 |
| 2,361,137 | Terry et al. | Oct. 24, 1944 |
| 2,514,463 | Bayers | July 11, 1950 |